(12) United States Patent
Shellhammer et al.

(10) Patent No.: US 9,300,404 B2
(45) Date of Patent: Mar. 29, 2016

(54) PHYSICAL-LAYER CHANNEL BONDING

(71) Applicant: QUALCOMM Incorporated, San Diego, CA (US)

(72) Inventors: Stephen J. Shellhammer, Nuremberg (DE); Patrick Stupar, Nuremberg (DE); Nicola Varanese, Nuremberg (DE); Andrea Garavaglia, Nuremberg (DE); Juan Montojo, Nuremberg (DE); Christian Pietsch, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 13/875,990

(22) Filed: May 2, 2013

(65) Prior Publication Data

US 2014/0186041 A1     Jul. 3, 2014

Related U.S. Application Data

(60) Provisional application No. 61/748,728, filed on Jan. 3, 2013.

(51) Int. Cl.
*H04B 10/27* (2013.01)
*H04Q 11/00* (2006.01)

(52) U.S. Cl.
CPC ........... *H04B 10/27* (2013.01); *H04Q 11/0071* (2013.01)

(58) Field of Classification Search
CPC ..................................................... H01J 14/086
USPC ........................................................ 370/464
See application file for complete search history.

(56) References Cited

U.S. PATENT DOCUMENTS

| | | | |
|---|---|---|---|
| 5,892,926 A | 4/1999 | Witkowski et al. | |
| 6,154,464 A | 11/2000 | Feuerstraeter et al. | |
| 7,017,176 B1 | 3/2006 | Lee et al. | |
| 7,394,825 B2 | 7/2008 | Kim et al. | |
| 7,551,610 B2 | 6/2009 | Cummings et al. | |
| 7,720,068 B2 | 5/2010 | McClellan | |
| 7,957,391 B1 | 6/2011 | Subramanian | |
| 7,970,374 B2 | 6/2011 | Riveiro et al. | |
| 8,064,477 B2 | 11/2011 | Kim et al. | |
| 8,311,412 B2 | 11/2012 | Rakib | |
| 2004/0120315 A1 | 6/2004 | Han et al. | |
| 2005/0058186 A1* | 3/2005 | Kryzak et al. | 375/219 |
| 2007/0154217 A1* | 7/2007 | Kim et al. | 398/72 |
| 2010/0153550 A1 | 6/2010 | Diab et al. | |

FOREIGN PATENT DOCUMENTS

CN            1512684 A         7/2004

OTHER PUBLICATIONS

Boyd, et al., "EPoC FDD Downstream Spectrum & Channel Bonding," IEEE 802.3bn EPoC, [ Sep. 2012, pp. 1-22.*

(Continued)

*Primary Examiner* — Ian N Moore
*Assistant Examiner* — Mewale Ambaye
(74) *Attorney, Agent, or Firm* — Mahamedi Paradice LLP

(57) ABSTRACT

A network device includes a plurality of physical-media entities (PMEs), each corresponding to a distinct channel, to generate transmit signals based on transmit packets received over a media-independent interface. The network device also includes a channel-bonding sublayer to direct the transmit packets from the media-independent interface to respective PMEs of the plurality of PMEs. The channel-bonding sublayer has a substantially fixed delay between the media-independent interface and the plurality of PMEs for the transmit packets.

25 Claims, 18 Drawing Sheets

(56) References Cited

OTHER PUBLICATIONS

Boyd, et al., "EPoC FDD Downstream Spectrum & Channel Bonding," IEEE 802.3bn EPoC, Sep. 2012, pp. 1-22.

Shellhammer, S. et al., "Channel Bonding Sub-layer", EPON over Coax IEEE 802.3 Plenary Session, San Antonio, TX, Nov. 12-15, 2012, 28 pages.
International Search Report and Written Opinion—PCT/US2013/071326—ISA/EPO—Feb. 18, 2014.

* cited by examiner

Channel-Bonding Table 500

| LLID | CBI(s) |
|------|--------|
| 5    | 1      |
| 7    | 1,2    |
| 12   | 1      |

FIG. 5

PHYSICAL-LAYER CHANNEL BONDING

RELATED APPLICATION

This application claims priority to U.S. Provisional Patent Application No. 61/748,728, titled "Physical Layer Channel Bonding," filed Jan. 3, 2013, which is hereby incorporated by reference in its entirety.

TECHNICAL FIELD

The present embodiments relate generally to communication systems, and specifically to communication systems that use multiple channels.

BACKGROUND OF RELATED ART

The Ethernet Passive Optical Networks (EPON) protocol may be extended over coaxial (coax) links in a cable plant. The EPON protocol as implemented over coax links is called EPoC. Implementing an EPoC network or similar network over a coax cable plant presents significant challenges. For example, multiple types of coax network units (CNUs) may be connected to the cable plant, with each type using a different set of frequency bands. The frequency bands used for communication between a coax line terminal (CLT) and CNUs of a given type may not be contiguous. Also, the CNUs may support a subset of the channels supported in the CLT.

BRIEF DESCRIPTION OF THE DRAWINGS

The present embodiments are illustrated by way of example and are not intended to be limited by the figures of the accompanying drawings.

FIG. 5 illustrates a channel-bonding table implemented in a channel-bonding sublayer in accordance with some embodiments.

Like reference numerals refer to corresponding parts throughout the drawings and specification.

DETAILED DESCRIPTION

Embodiments are disclosed in which packets are directed in a physical layer (PHY) with a substantially fixed delay.

In some embodiments, a network device includes a plurality of physical-media entities (PMEs), each corresponding to a distinct channel, to generate transmit signals based on transmit packets received over a media-independent interface. The network device also includes a channel-bonding sublayer (CBS) to direct the transmit packets from the media-independent interface to respective PMEs of the plurality of PMEs. The channel-bonding sublayer has a substantially fixed delay between the media-independent interface and the plurality of PMEs for the transmit packets.

In some embodiments, a method of operating a network device includes directing transmit packets from a media-independent interface to respective physical-media entities (PMEs) of a plurality of PMEs. A delay associated with the directing is substantially fixed. The method also includes generating transmit signals in the plurality of PMEs based on the transmit packets. Each PME of the plurality of PMEs generates transmit signals on a distinct channel of a plurality of channels.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scope all embodiments defined by the appended claims.

Figure 1A:
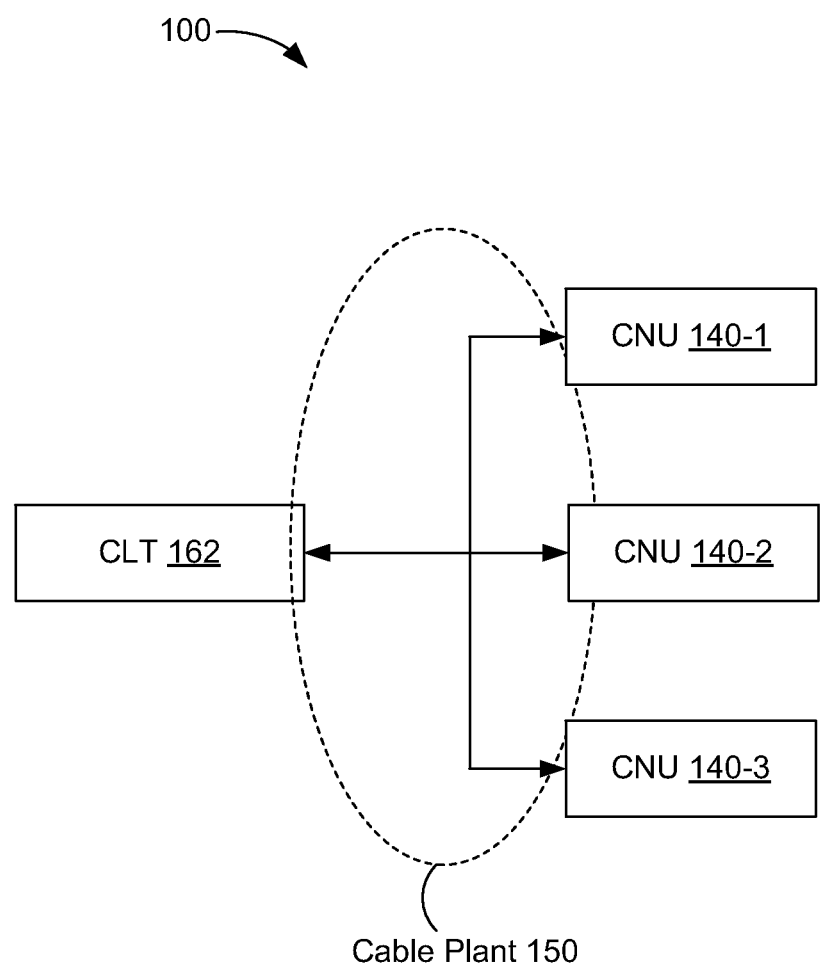
FIG. 1A is a block diagram of a coaxial network in accordance with some embodiments.

FIG. 1A is a block diagram of a coax network 100 (e.g., an EPoC network) in accordance with some embodiments. The network 100 includes a coax line terminal (CLT) 162 coupled to a plurality of coax network units (CNUs) 140-1, 140-2, and 140-3 via coax links. A respective coax link may be a passive coax cable, or may also include one or more amplifiers and/or equalizers. The coax links compose a cable plant 150. In some embodiments, the CLT 162 is located at the headend of the cable plant 150 or within the cable plant 150 and the CNUs 140 are located at the premises of respective users.

The CLT 162 transmits downstream signals to the CNUs 140-1, 140-2, and 140-3 and receives upstream signals from the CNUs 140-1, 140-2, and 140-3. In some embodiments, each CNU 140 (i.e., each of the CNUs 140-1, 140-2, and 140-3) receives every packet transmitted by the CLT 162 and discards packets that are not addressed to it. The CNUs 140-1, 140-2, and 140-3 transmit upstream signals at scheduled times (e.g., in scheduled time slots) specified by the CLT 162. For example, the CLT 162 transmits control messages (e.g., GATE messages) to the CNUs 140-1, 140-2, and 140-3 specifying respective future times at which respective CNUs 140 may transmit upstream signals.

Figure 1B:
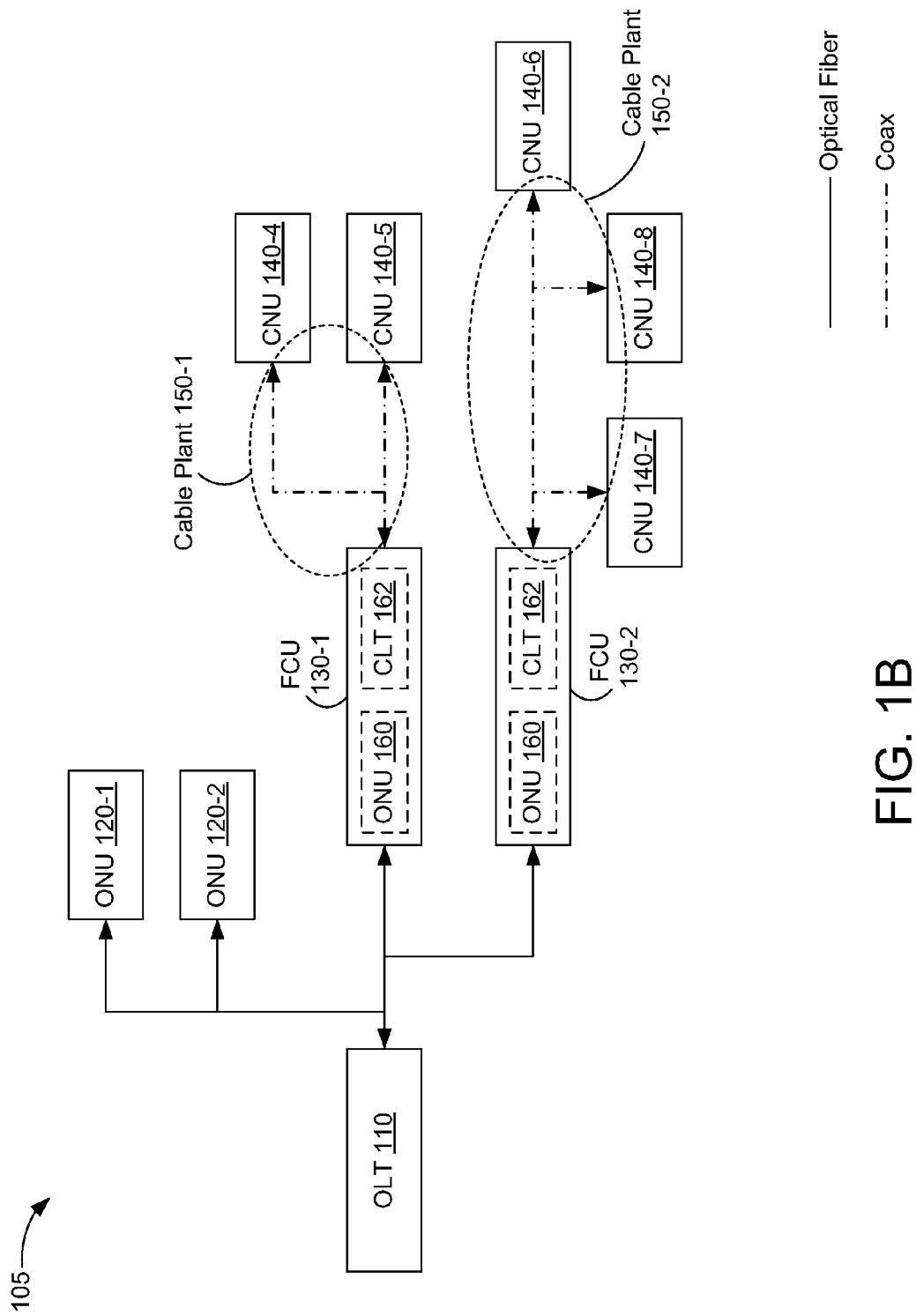
FIG. 1B is a block diagram of a network that includes both optical links and coax links in accordance with some embodiments.

In some embodiments, the CLT 162 is part of a fiber-coax unit (FCU) 130 that is also coupled to an optical line terminal (OLT) 110, as shown in FIG. 1B. FIG. 1B is a block diagram of a network 105 that includes both optical links and coax links in accordance with some embodiments. The network 105 includes an OLT 110 coupled to a plurality of optical network units (ONUs) 120-1 and 120-2 via respective optical fiber links. The OLT 110 also is coupled to a plurality of FCUs 130-1 and 130-2 via respective optical fiber links. (FCUs are sometimes also referred to as optical-coax units or OCUs).

In some embodiments, each FCU 130-1 and 130-2 includes an ONU 160 coupled with a CLT 162. The ONU 160 receives downstream packet transmissions from the OLT 110 and provides them to the CLT 162, which forwards the packets to the CNUs 140 (e.g., CNUs 140-4 and 140-5, or CNUs 140-6 through 140-8) on its cable plant 150 (e.g., cable plant 150-1 or 150-2). In some embodiments, the CLT 162 filters out packets that are not addressed to CNUs 140 on its cable plant 150 and forwards the remaining packets to the CNUs 140 on its cable plant 150. The CLT 162 also receives upstream packet transmissions from CNUs 140 on its cable plant 150 and provides these to the ONU 160, which transmits them to the OLT 110. The ONUs 160 thus receive optical signals from and transmit optical signals to the OLT 110, and the CLTs 162 receive electrical signals from and transmit electrical signals to CNUs 140.

In the example of FIG. 1B, the first FCU 130-1 communicates with CNUs 140-4 and 140-5, and the second FCU 130-2 communicates with CNUs 140-6, 140-7, and 140-8. The coax links coupling the first FCU 130-1 with CNUs 140-4 and 140-5 compose a first cable plant 150-1. The coax links coupling the second FCU 130-2 with CNUs 140-6 through 140-8 compose a second cable plant 150-2. A respective coax link may be a passive coax cable, or alternately may include one or more amplifiers and/or equalizers. In some embodiments, the OLT 110, ONUs 120-1 and 120-2, and optical portions of the FCUs 130-1 and 130-2 are implemented in accordance with the Ethernet Passive Optical Network (EPON) protocol.

In some embodiments, the OLT 110 is located at a network operator's headend, the ONUs 120 and CNUs 140 are located at the premises of respective users, and the FCUs 130 are located at the headends of their respective cable plants 150 or within their respective cable plants 150.

Figure 2A:
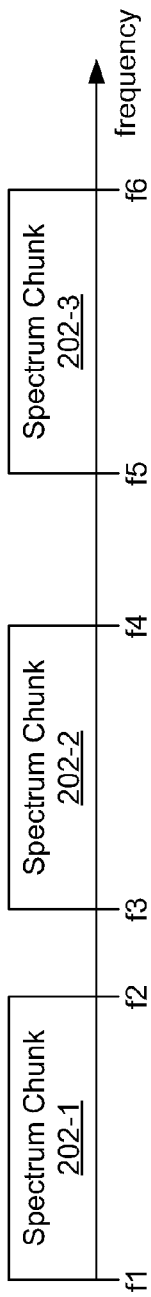
FIGS. 2A and 2B illustrate frequency spectra in accordance with some embodiments.

A CLT 162 may communicate with CNUs 140 on its cable plant 150 using multiple chunks (or in other words, bands) of frequency spectrum. FIG. 2A illustrates a frequency spectrum 200 that includes multiple spectrum chunks 202-1, 202-2, and 202-3 in accordance with some embodiments. Each of the chunks 202-1, 202-2, and 202-3 provides a distinct channel. For example, each of the chunks 202-1, 202-2, and 202-3 provides a distinct orthogonal frequency-division multiplexing (OFDM) channel. The chunk 202-1 extends from a lower frequency f1 to an upper frequency f2. The chunk 202-2 extends from a lower frequency f3 to an upper frequency f4. The chunk 202-3 extends from a lower frequency f5 to an upper frequency f6. The chunks 202-1, 202-2, and 202-3 thus are non-contiguous: the chunks 202-1 and 202-2 are separated by a frequency band between f2 and f3 and the chunks 202-2 and 202-3 are separated by a frequency band between f4 and f5. Despite the chunks 202-1, 202-2, and 202-3 being non-contiguous, the CLT 162 may transmit on two or more (e.g., all) of the corresponding channels, in a process known as channel bonding.

Furthermore, different CNUs 140 to which a CLT 162 is coupled may have different transmission and reception capabilities. The CNUs 140 may include a first group of CNUs 140 (e.g., of a first type or first generation) that can communicate using a first set of the spectrum chunks 202-1, 202-2, and 202-3 and a second group of CNUs 140 (e.g., of a second type or second generation) that can communicate using a second set of the spectrum chunks 202-1, 202-2, and 202-3. For example, the CNUs 140-1 and 140-2 (FIG. 1A) may be included in a first group and the CNU 140-3 (FIG. 1A) may be included in a second group; each group may include other CNUs not shown in FIG. 1A for simplicity. The first and second sets of the spectrum chunks 202-1, 202-2, and 202-3 may overlap. In one example, the first group of CNUs 140 can communicate with the CLT 162 using all three spectrum chunks 202-1, 202-2, and 202-3, while the second group of CNUs 140 can communicate with the CLT 162 using only a subset of the three spectrum chunks 202-1, 202-2, and 202-3. In another example, the first group of CNUs 140 can communicate with the CLT 162 using the spectrum chunks 202-1 and 202-2 and the second group of CNUs 140 can communicate using the spectrum chunks 202-2 and 202-3. In yet another example, one of the groups of CNUs 140 can communicate with the CLT 162 using only a single one of the spectrum chunks 202-1, 202-2, and 202-3. Other examples are possible.

Figure 2B:
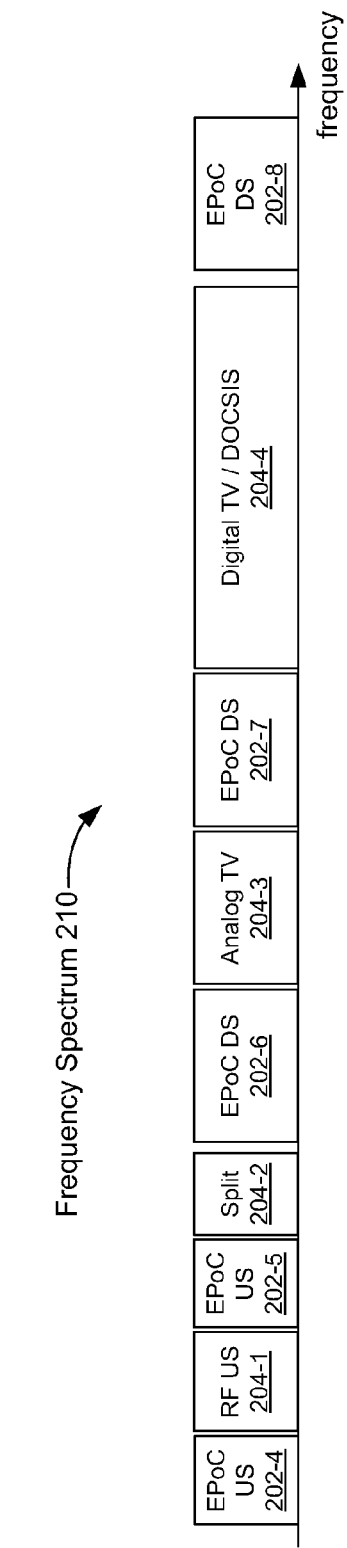

FIG. 2B illustrates another frequency spectrum 210 in accordance with some embodiments. The spectrum 210 includes spectrum chunks 202-4 through 202-8 that a CLT 162 may use for communication with CNUs 140 based for example on EPoC or a similar protocol. The spectrum chunks 202-4 through 202-8 are non-contiguous: they are separated by other spectrum chunks 204-1 through 204-4 that may be used for other services (e.g., legacy services) or may be unused. For example, the spectrum chunk 204-1 is used for radio-frequency (RF) upstream (US) transmissions, the spectrum chunk 204-2 is a split chunk that may act as a guard band, the spectrum chunk 204-3 is used for analog television, and the spectrum chunk 204-4 is used for digital television and for communications using the Data Over Cable Service Interface Specification (DOCSIS), a legacy protocol.

The frequency spectrum 210 illustrates frequency-division duplexing (FDD). Spectrum chunks 202-4 and 202-5 are dedicated for upstream (US) EPoC transmissions from CNUs 140 to a CLT 162, while spectrum chunks 202-6, 202-7, and 202-8 are dedicated for downstream (DS) EPoC transmissions from the CLT 162 to CNUs 140. (While the frequency spectrum 210 illustrates FDD, physical-layer channel bonding as described herein may also be performed for time-division duplexing (TDD), in which spectrum chunks are used for both upstream and downstream transmissions during respective time slots.) Furthermore, as discussed with regard to FIG. 2A, different CNUs 140 may use different spectrum chunks. For example, a first group of CNUs 140 may be capable of receiving downstream transmissions in all three EPoC DS spectrum chunks 202-6, 202-7, and 202-8, while a second group of CNUs 140 may be capable of receiving downstream transmissions in the EPoC DS spectrum chunks 202-6 and 202-7 but not the EPoC DS spectrum chunk 202-8. In this example, the CLT 162 is able to use all three EPoC DS spectrum chunks 202-6, 202-7, and 202-8 for communications with the first group of CNUs 140 and is also able to use the EPoC DS spectrum chunks 202-6 and 202-7 for communications with the second group of CNUs 140. In another example, the CLT 162 uses only one of the EPoC DS spectrum chunks 202-6, 202-7, and 202-8 for communications with a respective group of CNUs 140.

Figure 3A:
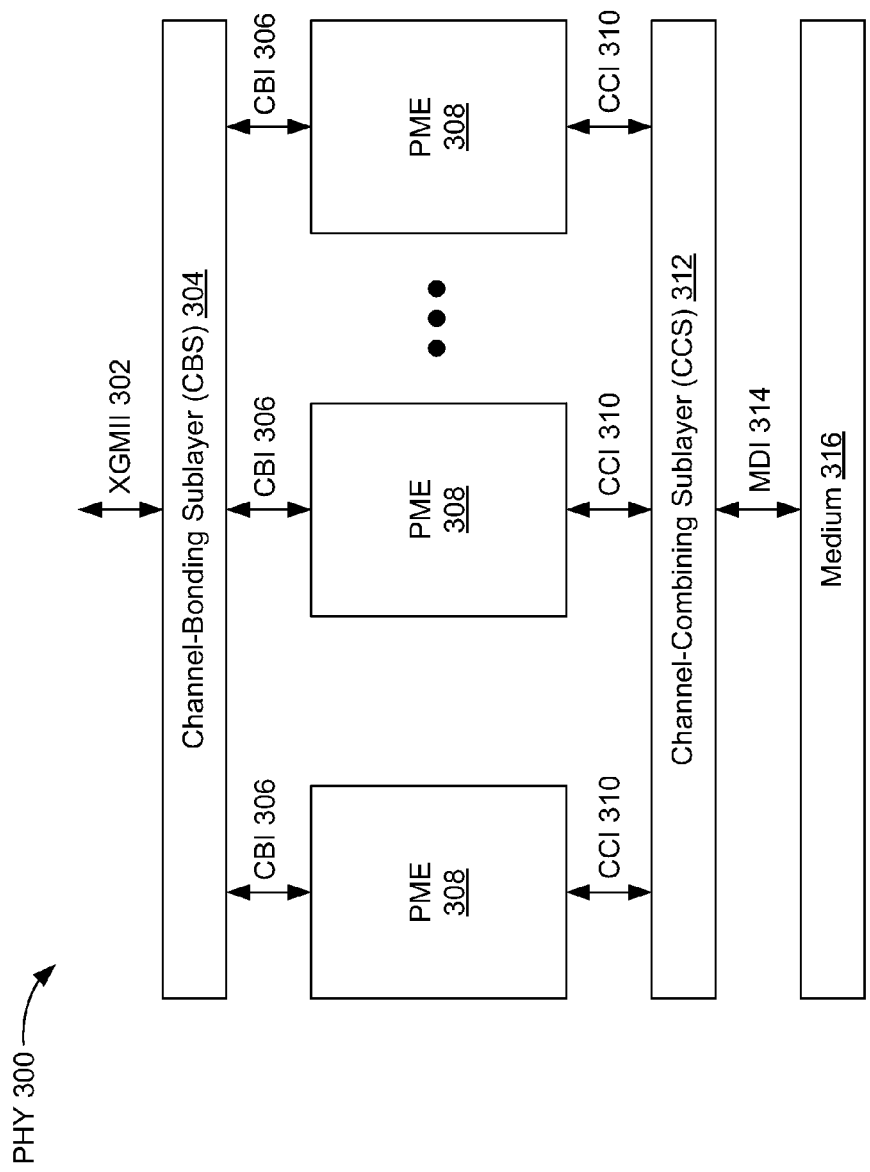
FIGS. 3A and 3B illustrate a physical layer device situated in a network device such as a coax line terminal or coax network unit in accordance with some embodiments.

FIG. 3A illustrates a physical layer (PHY) 300 in accordance with some embodiments. The PHY 300 is situated in a network device such as a CLT 162 or CNU 140. A first end of a media-independent interface 302 is coupled to a channel-bonding sublayer (CBS) 304. In some embodiments, the media-independent interface 302 is a 10 Gigabit Media-Independent Interface (XGMII) operating at 10 Gbps. The second end of the media-independent interface 302 is coupled to a reconciliation sublayer (not shown), which in turn is coupled to one or more media access control (MAC) sub-layers (not shown). The one or more MAC sub-layers are part of a data link layer that may also include a multipoint MAC control protocol (MPCP) sublayer; one or more operations, administration, and management (OAM) sublayers; and one or more MAC clients (not shown). Also, a scheduler may be situated above the MPCP sublayer.

In the PHY 300, the CBS 304 is coupled through a plurality of channel-bonding interfaces (CBIs) 306 to a plurality of respective physical-media entities (PMEs) 308. Each CBI 306 thus couples the CBS 304 to a respective PME 308. In some embodiments, each CBI 306 operates at the same data rate as the media-independent interface 302 (e.g., 10 Gbps); alternatively, each CBI 306 can either operate at the same rate as the media-independent interface 302 or can operate at a lower data rate than the media-independent interface 302 (e.g., 2.5 Gbps, as opposed to an XGMII data rate of 10 Gbps). Each PME 308 corresponds to a distinct spectrum chunk (e.g., a distinct one of the chunks 202-1, 202-2, and 202-3, FIG. 2A, or a distinct one of the chunks 202-6, 202-7, and 202-8, FIG. 2B) and thus to a distinct channel.

In the transmit direction, the CBS 304 receives transmit packets from the media-independent interface 302 and directs respective transmits packets to respective CBIs 306, which provide the transmit packets to respective PMEs 308. The PMEs 308 generate transmit signals on their respective channels based on the transmit packets. In the receive direction, the PMEs 308 recover packets from signals received on their respective channels. The CBS 304 receives the recovered packets from the PMEs 308 via the CBIs 306 and multiplexes the recovered packets onto the media-independent interface 302. When no packet is available to be sent across the media-independent interface 302 in a particular direction, idle characters are sent to maintain a constant data rate on the media-independent interface 302.

Each PME 308 is coupled through a respective channel-combining interface (CCI) 310 to a channel-combining sub-layer (CCS) 312, which combines transmit signals from the respective PMEs 308 and provides the combined transmit signals through a medium-dependent interface (MDI) 314 to a medium 316 (e.g., a coax link in a cable plant 150, FIGS. 1A-1B). The MDI 314 includes a connector to the medium 316. In some embodiments, the CCS 312 combines radio-frequency (RF) transmit signals from all of the PMEs 308 in the analog domain for transmission, and distributes received RF signals to all of the PMEs 308. Alternatively, the CCS 312 may perform channel combining in the digital domain (e.g., such that it is implemented within and across the PMDs 338, FIG. 3B).

In some embodiments, the number of channels (e.g., OFDM channels) supported in the PHY 300 is configured using a management data input/output (MDIO) interface.

In some embodiments, the transmit-direction signals used to convey transmit packets across the media-independent interface 302 include well-known XGMII signals TXD<31:0>, TXC<3:0>, and TX_CLK. In some embodiments, the receive-direction signals used to convey recovered packets across the media-independent interface 302 include well-known XGMII signals RXD<31:0>, RXC<3:0>, and RX_CLK.

Figure 3B:
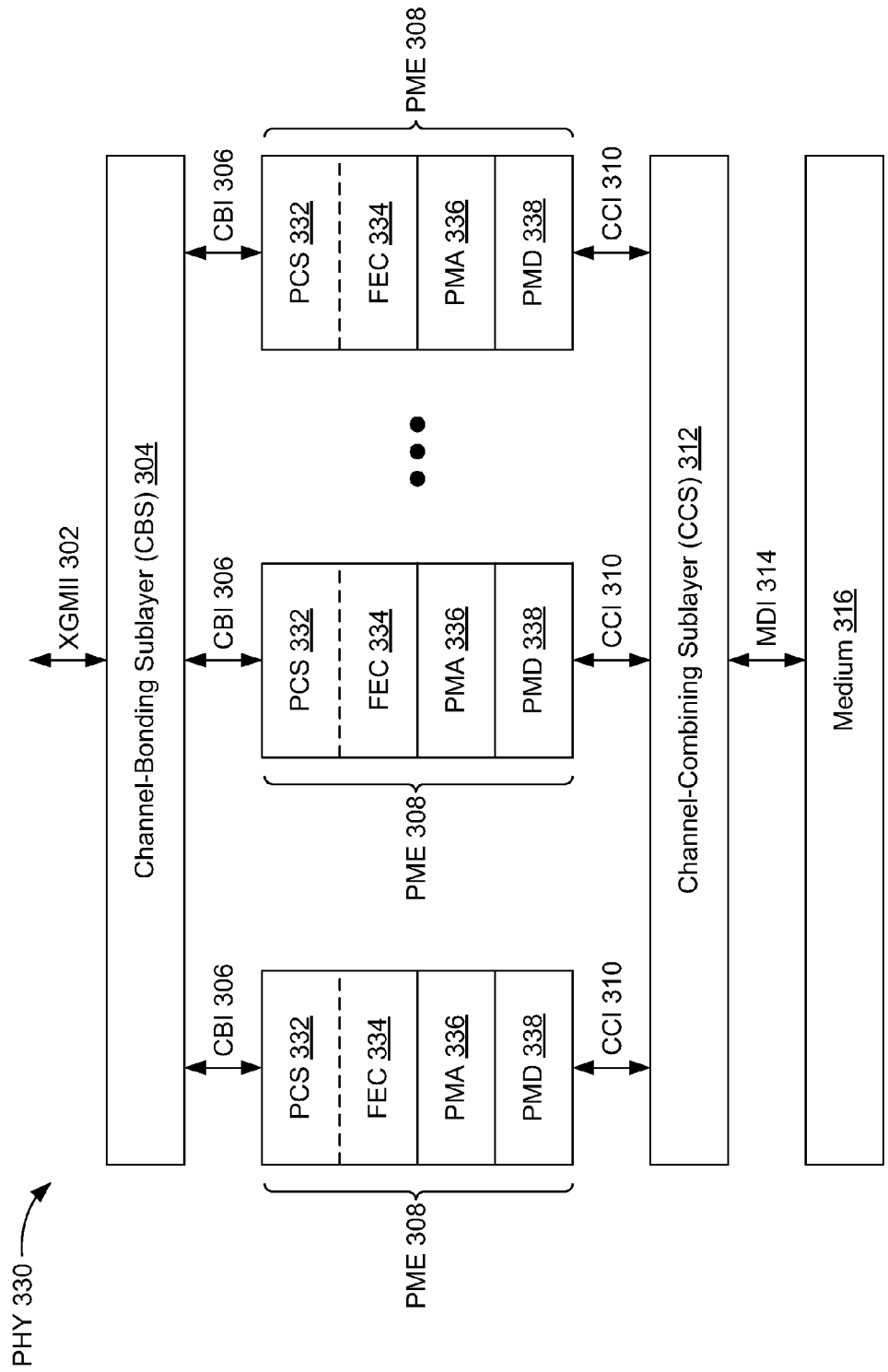

FIG. 3B shows a PHY 330 that is an example of the PHY 300 (FIG. 3A) in accordance with some embodiments. In the PHY 330, each PME 308 includes a physical coding sublayer (PCS) 332, forward-error correction sublayer (FEC) 334, physical medium attachment sublayer (PMA) 336, and physical medium dependent sublayer (PMD) 338 arranged in a stack, for example in accordance with the IEEE 802.3 family of standards. Each PCS 332/FEC 334/PMA 336/PMD 338 stack corresponds to a distinct spectrum chunk (e.g., a distinct one of the spectrum chunks 202-1, 202-2, and 202-3, FIG. 2A, or a distinct one of the spectrum chunks 202-6, 202-7, and 202-8, FIG. 2B) and thus to a distinct channel. Each PCS 332 is coupled through a respective CBI 306 to the media-independent interface 302. Each PMD 338 is coupled through a respective CCI 310 to the CCS 312.

Figure 3C:
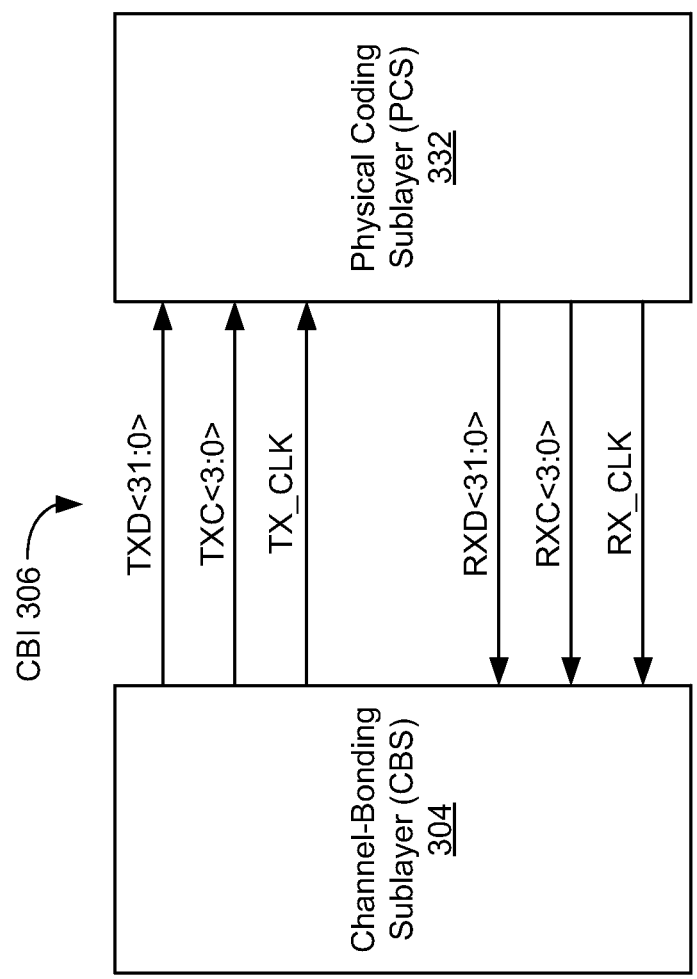
FIG. 3C is a block diagram illustrating signals on a channel-bonding interface of FIG. 3A or 3B in accordance with some embodiments.

FIG. 3C is a block diagram illustrating signals on a CBI 306 that couples the CBS 304 to a PCS 332, in accordance with some embodiments. In the example of FIG. 3C, the transmit and receive signals for the CBI 306 are the same as the transmit and receive signals for an XGMII implementation of the media-independent interface 302: TXD<31:0>, TXC<3:0>, and TX_CLK for the transmit direction and RXD<31:0>, RXC<3:0>, and RX_CLK for the receive direction. When no packet is available to be sent across a respective CBI 306 in a particular direction, idle characters are sent to maintain a constant data rate.

Figure 3D:
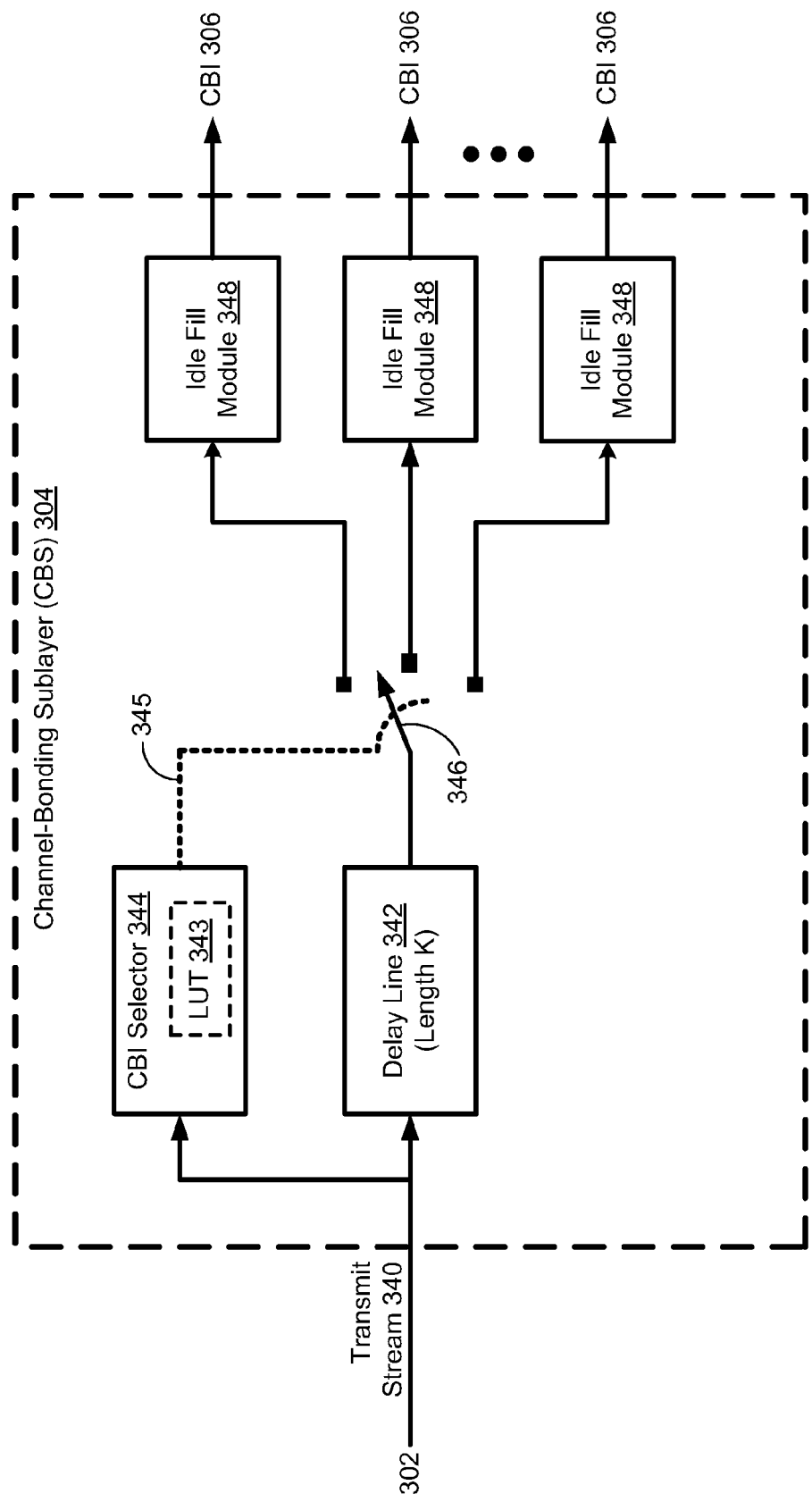
FIGS. 3D and 3E are block diagrams illustrating transmit-direction circuitry for the channel-bonding sublayer of FIG. 3A or 3B in accordance with some embodiments.

FIG. 3D is a block diagram illustrating transmit-direction circuitry for the CBS 304 in accordance with some embodiments. A transmit stream 340, which includes transmit packets and idle characters, is received from the media-independent interface 302 and provided to a delay line 342 of fixed length K (e.g., where K is a specified number of clock cycles) and to a CBI selector 344. In some embodiments, the width of the delay line 342 matches the width of the media-independent interface 302. For example, the delay line 342 and the media-independent interface 302 are both 32 bits wide. In some embodiments, the length K is configurable (e.g., may be programmed through an MDIO interface). A commutator 346 acts as a switch that selectively couples the delay line 342 to respective idle fill modules 348, each of which provides its output to a respective CBI 306.

The CBI selector 344 implements a CBI selection function that parses the transmit stream 340. For each respective transmit packet in the transmit stream 340, the CBI selector 344 selects the CBI 306 to which to direct the packet and, after a delay of K clock cycles (corresponding to the length of delay line 342), instructs the commutator 346 (e.g., using a commutator control signal 345) to couple the delay line 342 to the corresponding idle fill module 348. In some embodiments, the CBI selection function is based on a logical link identifier (LLID) embedded in a respective transmit packet (e.g., in the preamble). For example, the CBI selector 344 extracts the LLID from a transmit packet and performs a look-up in a look-up table (LUT) 343 (e.g., the channel-bonding table 500, FIG. 5) that maps LLIDs to CBIs 306. The commutator 346 stays in a particular position until the CBI selector 344 instructs it to change to a new position. When an idle fill module 348 receives a transmit packet from the commutator 346, it transmits the transmit packet onto the corresponding CBI 306 to which it is coupled. Otherwise, the idle fill module 348 transmits idle characters onto the corresponding CBI 306.

Figure 3E:
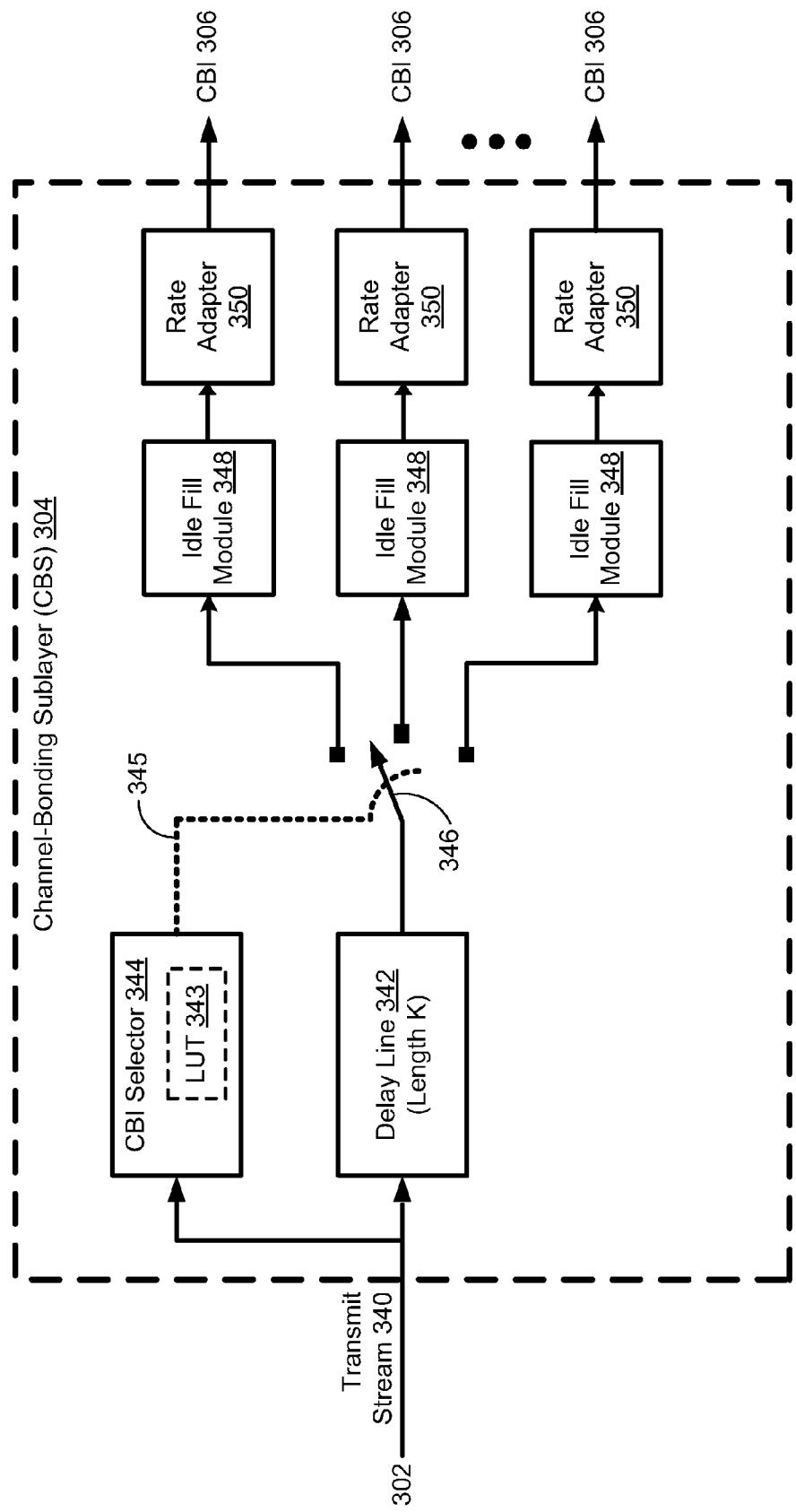

FIG. 3E is another block diagram illustrating transmit-direction circuitry for the CBS 304 in accordance with some embodiments. The transmit-direction circuitry of FIG. 3E may be used in embodiments in which the CBIs 306 have data rates that are different from (e.g., lower than) the data rate of the media-independent interface 302. Each idle fill module 348 provides its output to a respective rate adapter 350 that adapts the output to the data rate of the CBI 306. Each rate adapter 350 is thus coupled between its corresponding idle fill module 348 and CBI 306.

Figure 3F:
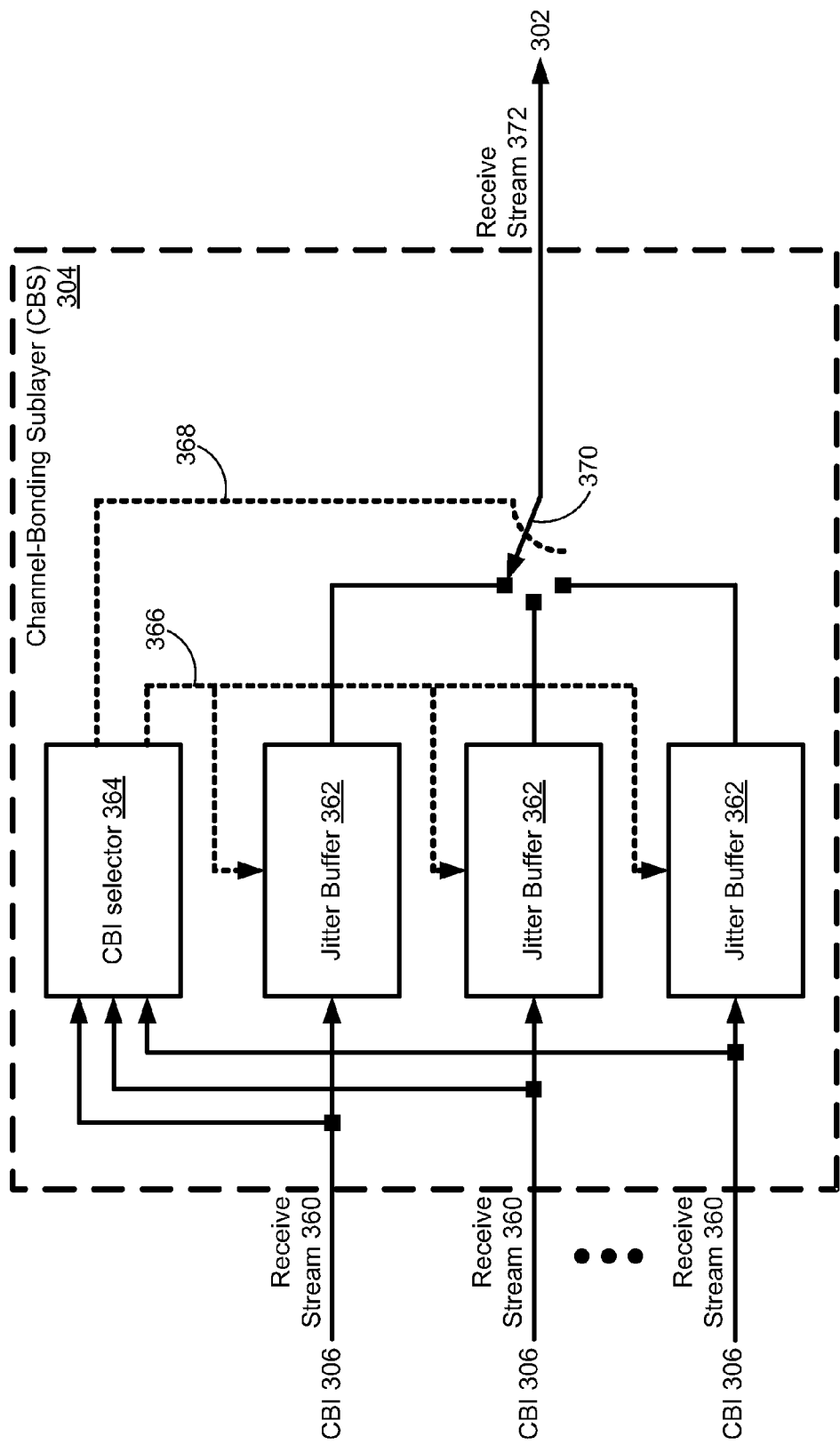
FIGS. 3F and 3G are block diagrams illustrating receive-direction circuitry for the channel-bonding sublayer of FIG. 3A or 3B in accordance with some embodiments.

FIG. 3F is a block diagram illustrating receive-direction circuitry for the CBS 304 in accordance with some embodiments. A receive stream 360 (including packets recovered from received signals and also including idle characters) on each CBI 306 is provided to a respective jitter buffer 362 and also to a CBI selector 364. The jitter buffers 362, which may be referred to as short-term jitter buffers, are used to reduce or eliminate frame overlap. A commutator 370 acts as a switch that selectively couples the jitter buffers 362 to the media-independent interface 302. The CBI selector 364 implements a CBI selection function that parses the CBI receive streams 360 to identify packets. Based on this parsing, the CBI selector 364 generates jitter buffer control signals 366 and provides the jitter buffer control signals 366 to the jitter buffers 362 to reduce or minimize frame overlap. Also based on this parsing, the CBI selector 364 generates a commutator control signal 368 to instruct the commutator 370 to couple the jitter buffer 362 that currently stores a packet to the media-independent interface 302. The jitter buffer 362 then forwards the packet onto the media-independent interface 302. The commutator 370 stays in a given position until a packet arrives in another jitter buffer 362, at which time the CBI selector 364 instructs the commutator 370 to couple the jitter buffer 362 that stores the newly arrived packet to the media-independent interface 302. The commutator 370 thereby provides a receive stream 372 (including packets recovered from received signals and also including idle characters) to the media-independent interface 302.

Figure 3G:
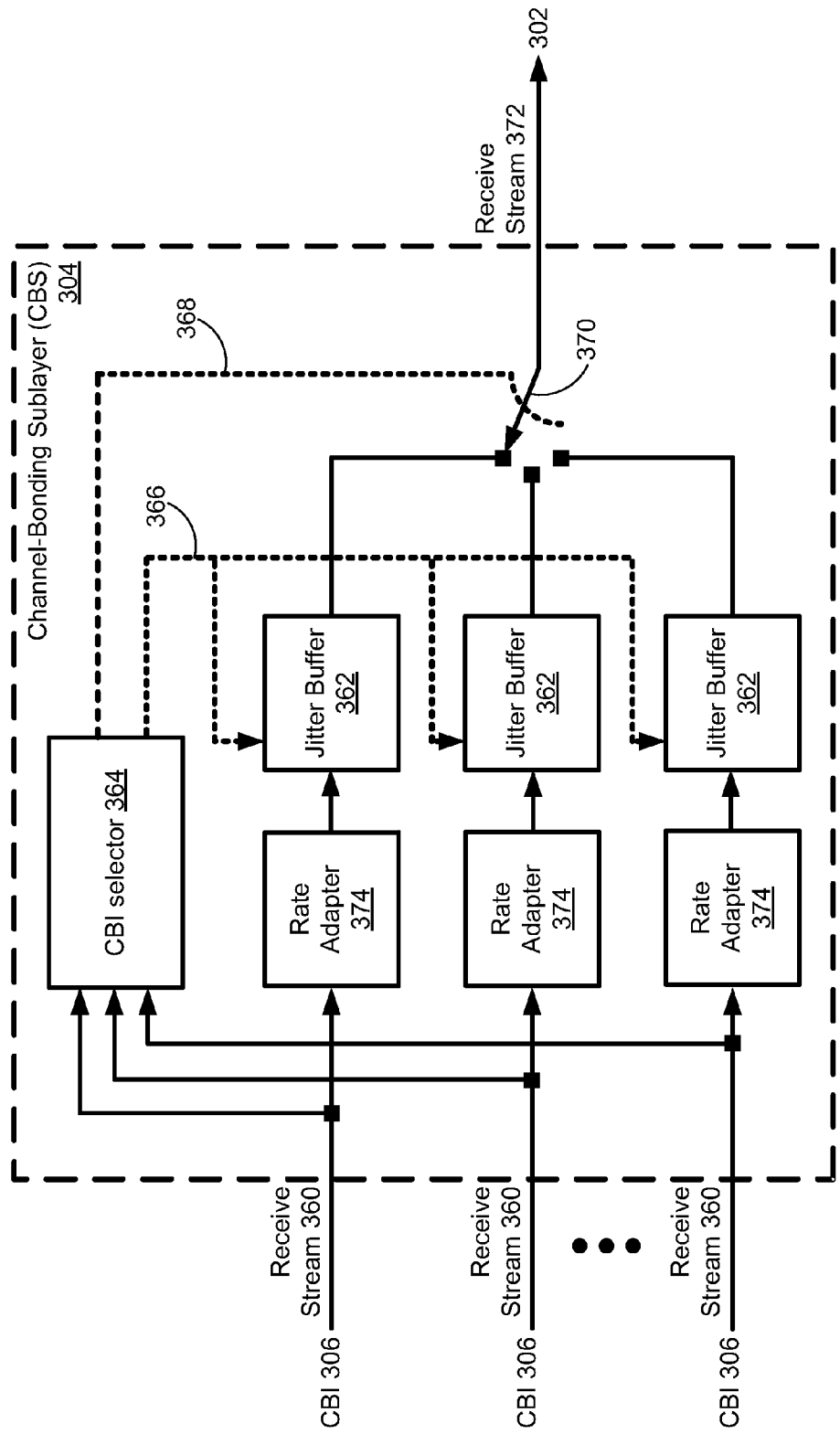

FIG. 3G is another block diagram illustrating receive-direction circuitry for the CBS 304 in accordance with some embodiments. The receive-direction circuitry of FIG. 3G may be used in embodiments in which the CBIs 306 have data rates that are different from (e.g., lower than) the data rate of the media-independent interface 302. A rate adapter 374 is coupled between each CBI 306 and its corresponding jitter buffer 362 to adapt packets from the data rate of the CBI 306 to the data rate of the media-independent interface 302.

Figure 4:
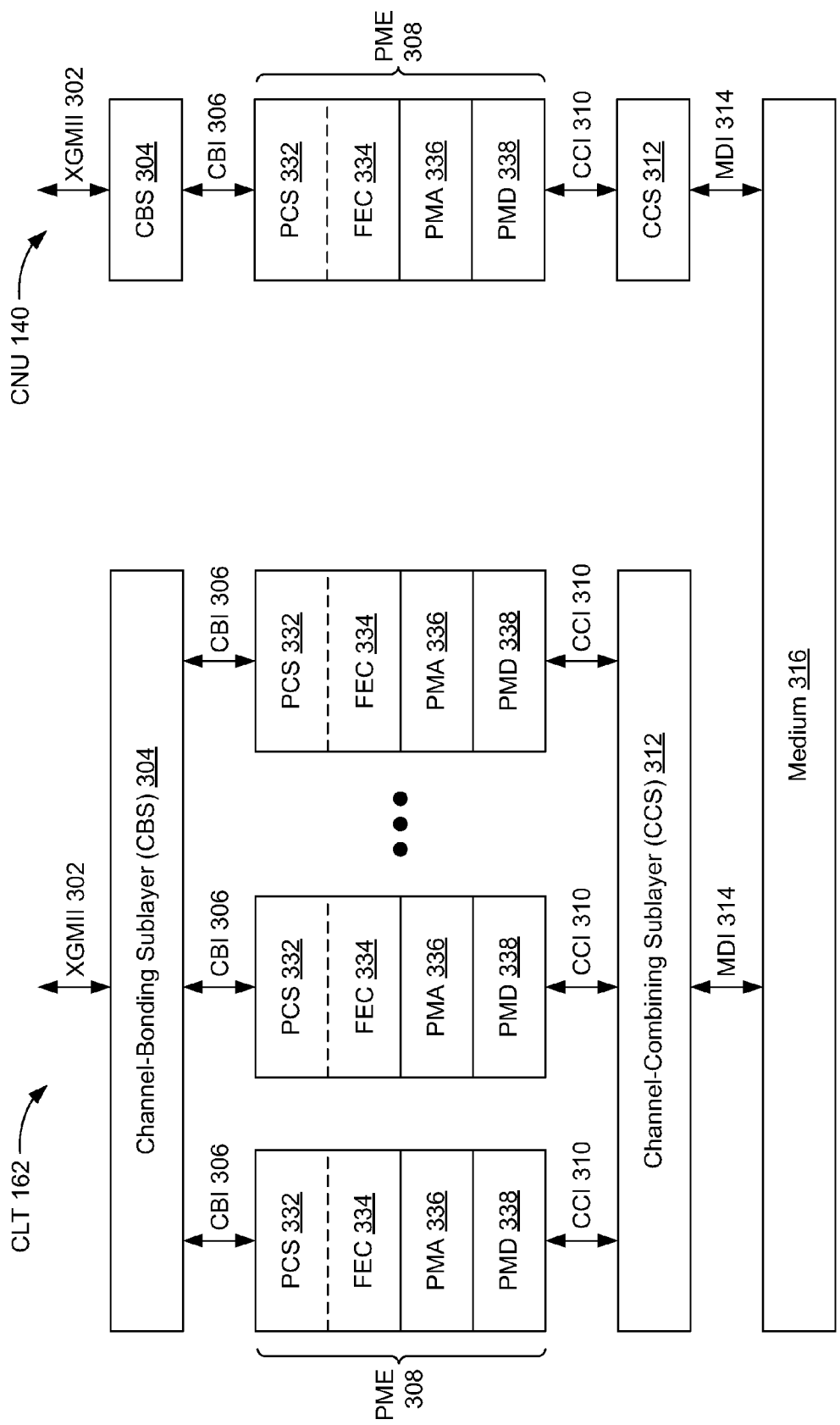
FIG. 4 illustrates an example of physical-layer protocol stacks in a coax line terminal and a coax network unit in accordance with some embodiments.

FIG. 4 illustrates an example of physical-layer protocol stacks in a CLT 162 and a CNU 140 (FIGS. 1A-1B) in accordance with some embodiments. The CLT 162 is coupled to the CNU 140 by a medium 316 (e.g., a coax link). In this example, the CLT 162 supports a plurality of OFDM channels (e.g., each in a separate spectrum chunk 202-1, 202-2, and 202-3, FIG. 2A, or 202-6, 202-7, and 202-8, FIG. 2B). The protocol stack for the CLT 162 is an example of the PHY 330 (FIG. 3B), with a different PME 308 (e.g., a different PCS 332/FEC 334/PMA 336/PMD 338 stack) for each channel. The CNU 140 in this example, however, only supports a single OFDM channel (e.g., in one of the spectrum chunks 202-1, 202-2, and 202-3, FIG. 2A, or 202-6, 202-7, and 202-8, FIG. 2B) and only has a single corresponding PME 308 (e.g., a single PCS 332/FEC 334/PMA 336/PMD 338 stack). When the CBS 304 in the CLT 162 receives a transmit packet to be transmitted to the CNU 140, it directs the transmit packet to the CBI 306 in the CLT 162 corresponding to the channel that the CNU 140 supports. The CBI 306 provides the transmit packet to the PME 308 in the CLT 162 for this channel, which generates a signal that the CCS 312 in the CLT 162 transmits through the MDI 314 onto the medium 316. The CCS 312 of the CNU 140 receives this signal and provides it to the PME 308 (e.g., the PCS 332/FEC 334/PMA 336/PMD 338 stack) in the CNU 140, which recovers the packet and forwards the recovered packet to the CBS 304 through the CBI 306. The CBS 304 in the CNU 140 forwards the recovered packet to a MAC sublayer (not shown) in the CNU 140 through the media-independent interface 302 and a reconciliation sublayer (not shown).

When the CBS 304 in the CNU 140 receives a transmit packet from the media-independent interface 302 for transmission to the CLT 162, it provides the packet to its PME 308 (e.g., its PCS 332/FEC 334/PMA 336/PMD 338 stack) through its CBI 306. The PME 308 generates a signal that the CCS 312 in the CNU 140 transmits through the MDI 314 onto the medium 316. The CCS 312 of the CLT 162 receives this signal, performs filtering to select the channel, and provides the signal to the corresponding PME 308 (e.g., the corresponding PCS 332/FEC 334/PMA 336/PMD 338 stack), which recovers the packet and forwards it to the CBS 304 in the CLT 162 through the CBI 306. Alternatively, the signal is provided to all of the PMEs 308; all of the PMEs 308 except the PME 308 corresponding to the channel on which the signal was transmitted filter out the signal. For example, the signal is provided to all of the PMDs 338; all of the PMDs 338 except the PMD 338 corresponding to the channel on which the signal was transmitted filter out the signal. The CBS 304 in the CLT 162 forwards the recovered packet to a MAC sublayer (not shown) in the CLT 162 through the media-independent interface 302 and a reconciliation sublayer (not shown).

In some embodiments, for a transmission from the CLT 162 to a CNU 140 that supports multiple channels for reception, the CBS 304 of the CLT 162 selects one of these channels and directs a transmit packet addressed to the CNU 140 to the CBI 306 in the CLT 162 that corresponds to the selected channel. Similarly, if the CNU 140 supports multiple channels for transmission, the CBS 304 of the CNU 140 selects one of the channels and directs a packet to be transmitted upstream to the CLT 162 to the CBI 306 (and thus the PME 308) in the CNU 140 that corresponds to the selected channel. In some embodiments, the CLT 162 supports each channel supported by every CNU 140 on its cable plant 150.

FIG. 5 illustrates a channel-bonding table 500 implemented in the CBS 304 in accordance with some embodiments. The channel-bonding table 500 may be implemented in the CBI selector 344 (FIG. 3D or 3E) as an example of a LUT 343 (FIG. 3D or 3E). The channel-bonding table 500 maps LLIDs to CBIs 306. The LLIDs in the channel-bonding table 500 may include LLIDs for specific CNUs 140, as specified in unicast transmit packets, and/or LLIDs for broadcast and/or multicast groups, as specified in broadcast and/or multicast transmit packets. (The CNUs 140 on a cable plant 150 may be grouped into a plurality of multicast groups, whereas all of the CNUs 140 on the cable plant 150 are included in a single broadcast group.) Each entry 502 in the channel-bonding table 500 includes an LLID field 504 and a CBI field 506, and thereby maps an LLID value to one or more CBIs 306. For example, an LLID with the value '5' is mapped to a first CBI 306, an LLID with the value '7' is mapped to the first CBI 306 and also to a second CBI 306, and an LLID with the value '12' is mapped to the first CBI 306. An LLID may be mapped to two CBIs 306 if the receiving device supports the two respective channels that correspond to the two CBIs 306. In some embodiments, when the CBI selector 344 (FIG. 3D or 3E) determines that an LLID maps to two (or more) CBIs 306, it selects one of the CBIs 306 (e.g., at random, based on a designation in the channel-bonding table 500 of one of the CBIs 306 as a primary CBI 306, or based on a designation contained in the packet as determined by a scheduler).

In some embodiments, the channel-bonding table 500 is configured and updated using an MDIO interface.

In some embodiments, as an alternative to using the channel-bonding table 500, transmit packets received at the CBS 304 from the media-independent interface 302 may have a tag embedded in them specifying the CBI 306 to be used (e.g., as determined by a scheduler above the MPCP sublayer, not shown). The CBI selector 344 (FIG. 3D or 3E) extracts this tag and positions the commutator 346 (FIG. 3D or 3E) accordingly.

Figure 6A:
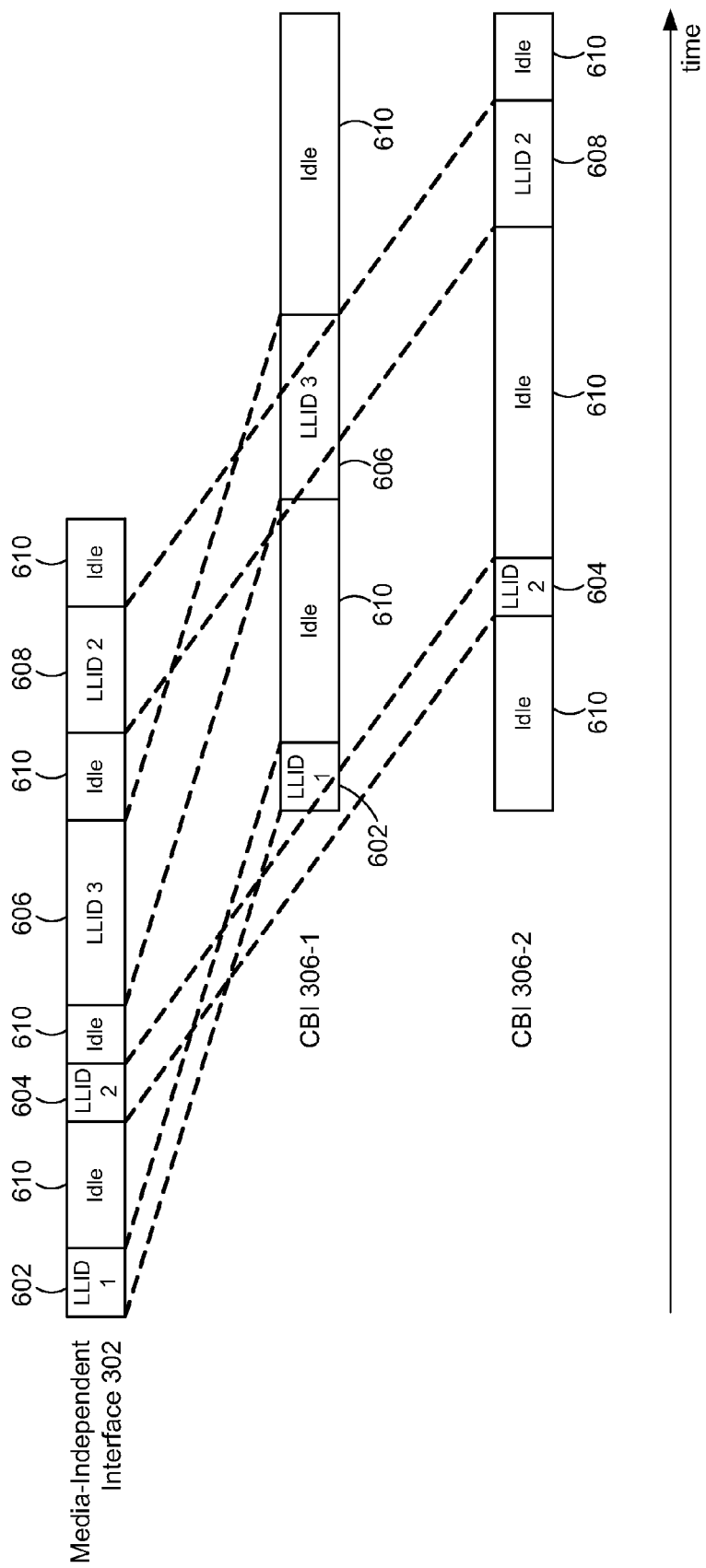
FIG. 6A illustrates a fixed delay through a channel-bonding sublayer for transmission in accordance with some embodiments.

In some embodiments, there is a (substantially) fixed delay through the CBS 304. FIG. 6A illustrates the fixed delay through the CBS 304 for transmission in accordance with some embodiments, by illustrating transmit streams for the media-independent interface 302 and two CBIs 306-1 and 306-2. The media-independent interface 302 provides transmit packets 602, 604, 606, and 608 to the CBS 304. Each of the packets 602, 604, 606, and 608 includes an LLID (e.g., embedded in the preamble): LLID 1 for packet 602, LLID 2 for packet 604, LLID 3 for packet 606, and LLID 2 for packet 608. Based on the LLIDs (e.g., using the channel-bonding table 500, FIG. 5), the CBS 304 directs each of the packets 602, 604, 606, and 608 to one of the CBIs 306-1 and 306-2. Packets 602 and 606 are directed to the first CBI 306-1 and packets 604 and 608 are directed to the second CBI 306-2. The time between the receipt of each packet 602, 604, 606, and 608 from the media-independent interface 302 to transmission of each packet 602, 604, 606, and 608 on the first CBI 306-1 or second CBI 306-2 is (substantially) fixed, thus showing that the transmission delay through the CBS 304 is fixed (e.g., to within a degree provided by the transmit-direction circuitry of FIG. 3D or 3E).

As FIG. 6A shows, the media-independent interface 302 and the CBIs 306-1 and 306-2 send idle characters 610 in the transmit direction when no packets are available.

Figure 6B:
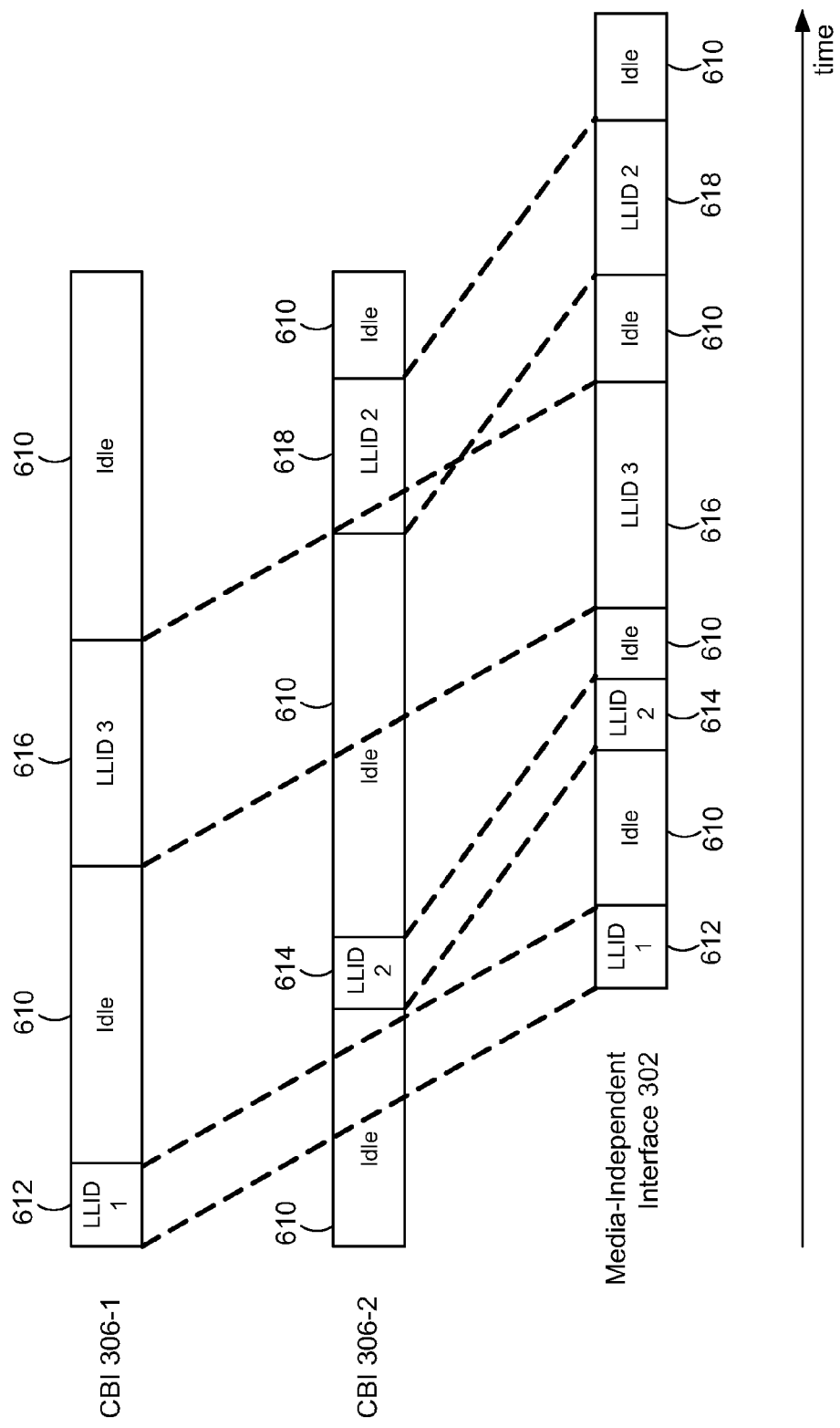
FIG. 6B illustrates a fixed delay through a channel-bonding sublayer for reception in accordance with some embodiments.

FIG. 6B illustrates the (substantially) fixed delay through a CBS 304 for reception of four packets 612, 614, 616, and 618 (as recovered from received signals) in accordance with some embodiments, by illustrating data streams for two CBIs 306-1 and 306-2 and a media-independent interface 302 in the receive direction. Each of the packets 612, 614, 616, and 618 includes an LLID (e.g., embedded in the preamble): LLID 1 for packet 612, LLID 2 for packet 614, LLID 3 for packet 616, and LLID 2 for packet 618. LLIDs 1 and 3 correspond to a channel associated with the first CBI 306-1, while LLID 2 corresponds to a channel associated with the second CBI 306-2. The first CBI 306-1 provides packets 612 and 616 to the CBS 304. The second CBI 306-2 provides packets 614 and 618 to the CBS 304. The CBS 304 transmits the packets 612, 614, 616, and 618 onto the media-independent interface 302. The time between the receipt of each packet 612, 614, 616, and 618 from the first CBI 306-1 or second CBI 306-2 to transmission of each packet 612, 614, 616, and 618 on the media-independent interface 302 is (substantially) fixed, thus showing that the reception delay through the CBS 304 is fixed (e.g., to within a degree provided by the receive-direction circuitry of FIG. 3F or 3G).

As FIG. 6B shows, the CBIs 306-1 and 306-2 and the media-independent interface 302 send idle characters 610 in the receive direction when no packets are available.

FIG. 6A thus shows a fixed delay through the CBS 304 of a transmitting device (e.g., the CLT 162, or alternatively the CNU 140) and FIG. 6B thus shows a fixed delay through the CBS 304 of a receiving device (e.g., the CNU 140, or alternatively the CLT 162). Furthermore, the delay from transmit PCS 332 to receive PCS 332 may be fixed, resulting in a (substantially) constant delay between the media-independent interface 302 in the transmitter and the media-independent interface 302 in the receiver.

Attention is now directed to broadcasting and multicasting of packets. For each broadcasting and/or multicasting LLID, a group of one or more channels (a "broadcast/multicast channel group") is defined. For example, CBI(s) 306 corresponding to the one or more channels in the group are mapped to the LLID in the channel-bonding table 500 (FIG. 5). Broadcast/multicast packets are transmitted on all of the channels in the broadcast/multicast channel group.

Figure 7A:
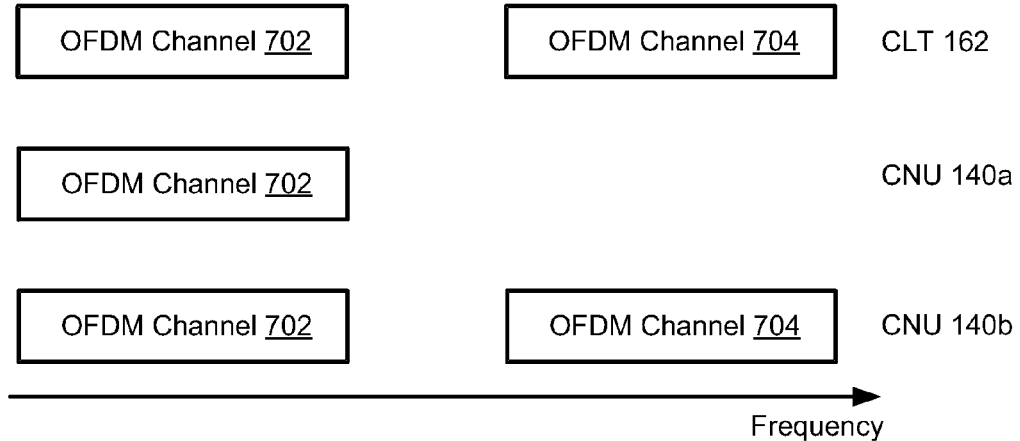
FIGS. 7A-7C illustrate examples of broadcasting or multicasting groups in accordance with some embodiments.

FIG. 7A illustrates an example of a broadcasting or multicasting group that includes two CNUs 140, CNU 140a and CNU 140b. The CNU 140a supports only a first channel 702 (e.g., an OFDM channel, which may correspond to a first one of the chunks 202-1, 202-2, and 202-3, FIG. 2A, or 202-6, 202-7, and 202-8, FIG. 2B). The CNU 140b supports the first channel 702 and also supports a second channel 704 (e.g., an OFDM channel, which may correspond to a second one of the chunks 202-1, 202-2, and 202-3, FIG. 2A, or 202-6, 202-7, and 202-8, FIG. 2B). A CLT 162 coupled to the CNU 140a and CNU 140b also supports the first channel 702 and the second channel 704. In this example, the first channel 702, but not the second channel 704, is sufficient for broadcasting or multicasting packets to the CNU 140a and CNU 140b, and thus is selected as the broadcast/multicast channel group. In some embodiments, the CLT 162 maps the LLID for this broadcasting or multicasting group to the CBI 306 corresponding to the first channel 702. This mapping is performed, for example, in the channel-bonding table 500 (FIG. 5).

Figure 7B:
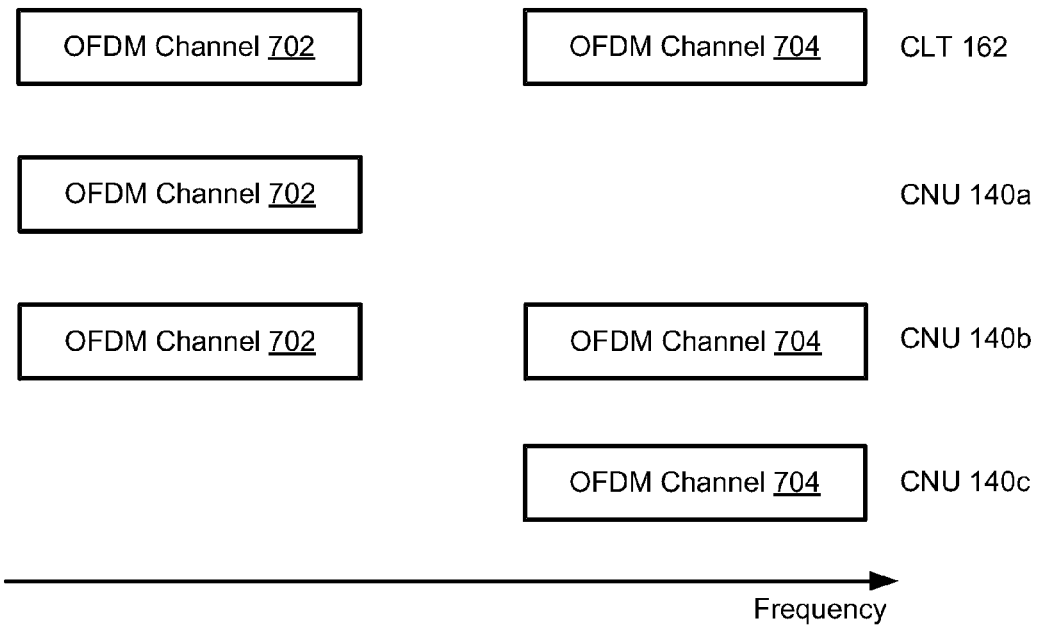

FIG. 7B illustrates an example of a broadcasting or multicasting group that includes three CNUs 140: CNU 140a, CNU 140b, and CNU 140c. CNU 140a supports only the first channel 702, CNU 140b supports both the first channel 702 and the second channel 704, and CNU 140c supports only the second channel 704. A CLT 162 coupled to the CNU 140a, CNU 140b, and CNU 140c supports the first channel 702 and the second channel 704. In this example, neither the first channel 702 nor the second channel 704 is sufficient for broadcasting or multicasting packets to the group. Both the first channel 702 and the second channel 704 are thus included in the broadcast/multicast channel group. In some embodiments, the CLT 162 maps the LLID for this broadcasting or multicasting group to the CBIs 306 corresponding to the first channel 702 and the second channel 704. This mapping is performed, for example, in the channel-bonding table 500 (FIG. 5). When the CBS 304 receives a broadcast or multicast packet with this LLID, it provides a first copy of the packet to the CBI 306 corresponding to the first channel 702 and a second copy of the packet to the CBI 306 corresponding to the second channel 704. The CNU 140b is configured with a primary broadcast/multicast channel list such that either the first channel 702 or the second channel 704 is specified as the primary broadcast/multicast channel to be used to receive broadcast/multicast packets: the CBS 304 in the CNU 140b only forwards broadcast/multicast packets received on the primary broadcast/multicast channel on to the MAC sublayer through the media-independent interface 302. The primary broadcast/multicast channel list may be configured using an MDIO interface.

Figure 7C:
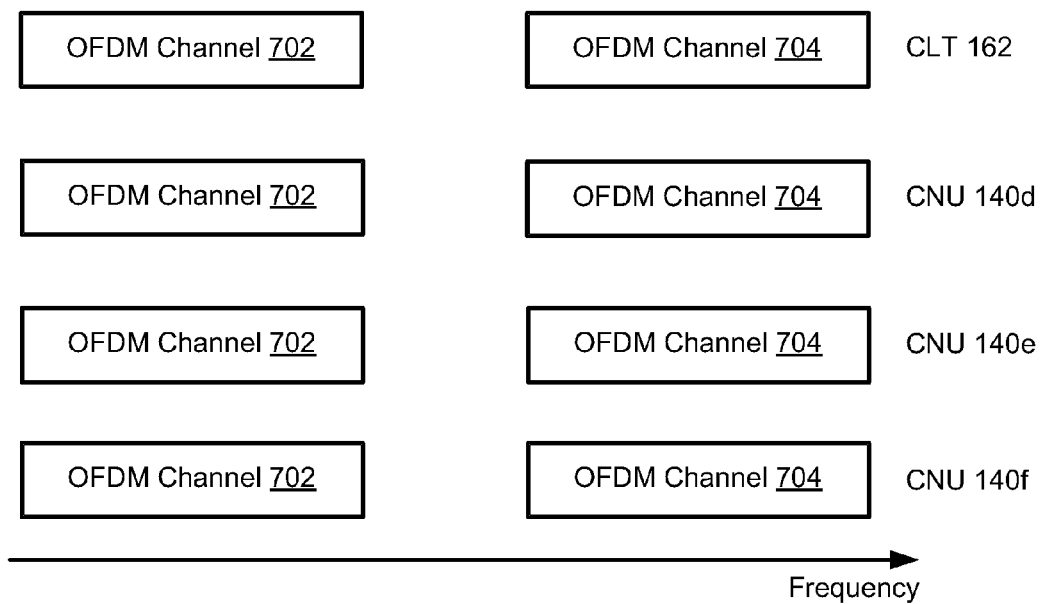

FIG. 7C illustrates another example of a broadcasting or multicasting group that includes three CNUs 140: CNU 140*d*, CNU 140*e*, and CNU 140*f*. All three CNUs 140*d*, 140*e*, and 140*f* support the first channel 702 and the second channel 704. The CLT 162 coupled to the three CNUs 140*d*, 140*e*, and 140*f* also supports the first channel 702 and the second channel 704. Either the first channel 702 or the second channel 704 is thus included in the broadcast/multicast channel group (e.g., as defined in the channel-bonding table 500, FIG. 5).

Attention is now directed to methods of operating a PHY such as the PHY 300 (FIG. 3A) in accordance with some embodiments.

Figure 8A:
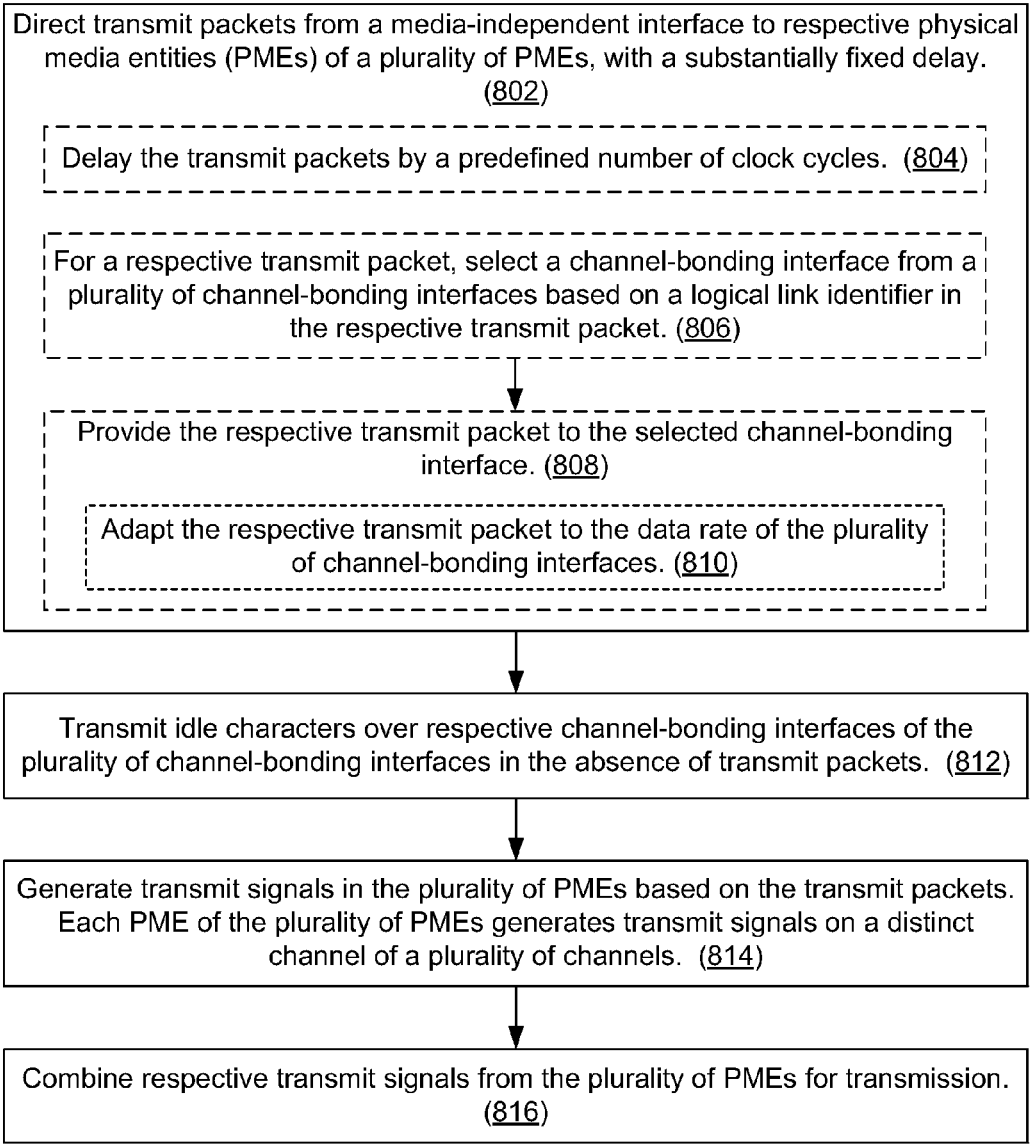
FIG. 8A is a flowchart showing a method of transmitting data in accordance with some embodiments.

FIG. 8A is a flowchart showing a method 800 of transmitting data in accordance with some embodiments. The method 800 be may performed in the PHY 300 (FIG. 3A) (e.g., in the PHY 330, FIG. 3B).

In the method 800, transmit packets are directed (802) from a media-independent interface 302 to respective PMEs 308 of a plurality of PMEs 308. A delay associated with the directing is substantially fixed delay. In some embodiments, the directing is performed in a CBS 304.

In some embodiments, directing the transmit packets includes delaying (804) the transmit packets by a predefined number of clock cycles. For example, the delay line 342 (FIG. 3D or 3E) in the CBS 304 may delay the transmit packets by a predefined number of clock cycles.

In some embodiments, directing a respective transmit packet includes selecting (806) a CBI 306 from a plurality of CBIs 306 based on an LLID in the respective transmit packet. For example, a CBI selector 344 (FIG. 3D or 3E) performs a look-up in a LUT 343 (e.g., the channel-bonding table 500, FIG. 5) to map the LLID to one of the plurality of CBIs 306, and thus to one of the plurality of PMEs 308. The respective transmit packet is provided (808) to the selected CBI 306. In some embodiments (e.g., in which the CBIs 306 have a different data rate than the media-independent interface 302), the respective transmit packet is adapted (810) to the data rate of the plurality of CBIs 306. For example, a rate adapter 350 (FIG. 3E) adapts the rate of the respective transmit packet.

In some embodiments, idle characters are transmitted (812) over respective CBIs 306 in the absence of transmit packets. For example, idle fill modules 348 in the CBS 304 (FIGS. 3D-3E) transmit idle characters over respective CBIs 306 in the absence of transmit packets.

Transmit signals (e.g., OFDM symbols) are generated (814) in the plurality of PMEs 308 based on the transmit packets. Each PME 308 of the plurality of PMEs 308 generates transmit signals on a distinct channel of a plurality of channels. For example, each PME 308 generates transmit signals on a distinct chunk of a frequency spectrum (e.g., a distinct one of the spectrum chunks 202-1, 202-2, and 202-3, FIG. 2A, or a distinct one of the spectrum chunks 202-6, 202-7, and 202-8, FIG. 2B). Respective transmit signals from the plurality of PMEs 308 are combined (816) for transmission (e.g., by the CCS 312, FIGS. 3A-3B).

Figure 8B:
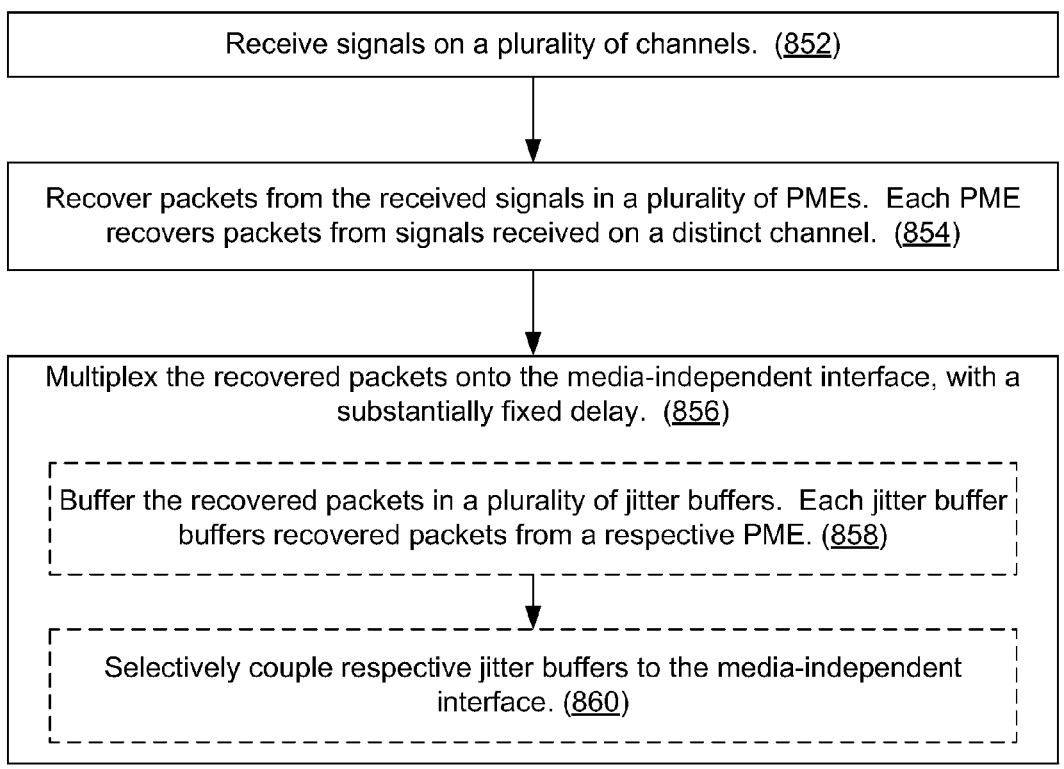
FIG. 8B is a flowchart showing a method of receiving data in accordance with some embodiments.

FIG. 8B is a flowchart showing a method 850 of receiving data in accordance with some embodiments. The method 850 may be performed in the PHY 300 (FIG. 3A) (e.g., in the PHY 330, FIG. 3B). In some embodiments, the method 850 is performed in conjunction with the method 800 (e.g., such that a PHY 300 performs both the method 800 and the method 850).

In the method 850, signals are received (852) on a plurality of channels. Packets are recovered (854) from the received signals in a plurality of PMEs 308. Each PME 308 recovers packets from signals received on a distinct channel of the plurality of channels. For example, each PME 308 recovers packets from signals received on the channel on which the PME 308 generates (814, FIG. 8A) transmit signals in the method 800. In some embodiments, each channel corresponds to a distinct chunk of a frequency spectrum (e.g., a distinct one of the spectrum chunks 202-1, 202-2, and 202-3, FIG. 2A, or a distinct one of the spectrum chunks 202-6, 202-7, and 202-8, FIG. 2B).

The recovered packets are multiplexed (856) onto the media-independent interface 302. A delay associated with multiplexing the recovered packets onto the media-independent interface 302 is substantially fixed.

In some embodiments, multiplexing the recovered packets includes buffering (858) the recovered packets in a plurality of jitter buffers 362 (FIG. 3F or 3G). Each jitter buffer 362 buffers recovered packets from a respective PME 308. Respective jitter buffers are selectively coupled (860) to the media-independent interface 302 (e.g., by the commutator 370 as controlled by the CBI selector 364, FIG. 3F or 3G).

The fixed delays in the methods 800 and 850 result in low jitter, which improves signal transmission and reception quality.

While the methods 800 and 850 include a number of operations that appear to occur in a specific order, it should be apparent that the methods 800 and 850 can include more or fewer operations. Respective operations in the methods 800 and 850 may be executed serially or in parallel. An order of two or more operations may be changed, performance of two or more operations may overlap, and two or more operations may be combined into a single operation.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A network device including a physical-layer (PHY) device, the PHY device comprising:

a plurality of physical-media entities (PMEs), each corresponding to a distinct channel, to generate transmit signals based on transmit packets received over a media-independent interface and to recover packets from received signals; and the channel-bonding sublayer (CBS) to direct the transmit packets from the media-independent interface to respective PMEs of the plurality of PMEs and to multiplex the recovered packets onto the media-independent interface, the channel-bonding sublayer having a fixed delay between the media-independent interface and the plurality of PMEs for the transmit packets and for the recovered packets, wherein:

the network device further comprises a plurality of channel-bonding interfaces to couple the plurality of PMEs to the channel-bonding sublayer; and the channel-bonding sublayer comprises, in a receive direction, a plurality of jitter buffers to buffer the recovered packets, wherein respective jitter buffers of the plurality of jitter buffers are coupled to respective channel-bonding interfaces of the plurality of channel-bonding interfaces.

2. The network device of claim 1, further comprising a channel-combining sublayer to combine respective transmit signals from the plurality of PMEs for transmission.

3. The network device of claim 1, wherein the channel-bonding sublayer comprises, in a transmit direction, a fixed delay line to couple with the media-independent interface, to delay the transmit packets in accordance with the fixed delay.

4. The network device of claim 3, wherein the fixed delay line is to delay the transmit packets by a predefined number of clock cycles.

5. The network device of claim 4, wherein the predefined number of clock cycles is configurable.

6. The network device of claim 3, wherein the channel-bonding sublayer further comprises, in the transmit direction:
a plurality of idle fill modules, each coupled to a respective PME;
a commutator to selectively couple the fixed delay line to respective idle fill modules of the plurality of idle fill modules; and
a selector to control the commutator based on logical link identifiers in respective transmit packets.

7. The network device of claim 6, wherein the network device further comprises a plurality of channel-bonding interfaces to couple the channel-bonding sublayer to the plurality of PMEs, wherein respective channel-bonding interfaces are coupled to respective idle fill modules.

8. The network device of claim 7, wherein:
a data rate of the plurality of channel-bonding interfaces is distinct from a data rate of the media-independent interface; and
the channel-bonding sublayer further comprises, in the transmit direction, a plurality of rate adapters, each coupled to a respective idle fill module, to adapt the transmit packets to the data rate of the plurality of channel-bonding interfaces.

9. The network device of claim 1, wherein:
the transmit packets comprise respective logical link identifiers (LLIDs); and
the channel-bonding sublayer comprises a look-up table to map the LLIDs to respective channels corresponding to respective PMEs.

10. The network device of claim 1, wherein the channel-bonding sublayer further comprises, in the receive direction:
a commutator to selectively couple respective jitter buffers of the plurality of jitter buffers to the media-independent interface; and
a selector to control the commutator in response to the recovered packets.

11. The network device of claim 1, wherein each channel corresponds to a distinct chunk of a frequency spectrum.

12. The network device of claim 11, wherein the transmit signals comprise orthogonal frequency-division multiplexing (OFDM) signals.

13. The network device of claim 1, wherein a respective PME of the plurality of PMEs comprises a physical coding sublayer, forward-error correction sublayer, physical medium attachment sublayer, and physical medium dependent sublayer.

14. A method of operating a network device, comprising:
directing transmit packets from a media-independent interface to respective physical-media entities (PMEs) of a plurality of PMEs, wherein a delay associated with the directing is fixed;
generating transmit signals in the plurality of PMEs based on the transmit packets, wherein each PME of the plurality of PMEs generates transmit signals on a distinct channel of a plurality of channels;
receiving signals on the plurality of channels;
recovering packets from the received signals in the plurality of PMEs, wherein each PME of the plurality of PMEs recovers packets from signals received on the distinct channel on which the PME generates transmit signals; and
multiplexing the recovered packets onto the media-independent interface, wherein a delay associated with the multiplexing is fixed, wherein the multiplexing comprises buffering the recovered packets in a plurality of jitter buffers, wherein each jitter buffer comprises selectively coupling respective jitter buffers of the plurality of jitter buffers to the media-independent interface.

15. The method of claim 14, further comprising combining respective transmit signals from the plurality of PMEs for transmission.

16. The method of claim 14, wherein the directing comprises delaying the transmit packets by a predefined number of clock cycles.

17. The method of claim 14, wherein the directing comprises, for a respective transmit packet:
selecting a channel-bonding interface from a plurality of channel-bonding interfaces based on a logical link identifier in the respective transmit packet, wherein each channel-bonding interface of the plurality of channel-bonding interfaces is coupled to a respective PME of the plurality of PMEs; and providing the respective transmit packet to the selected channel-bonding interface.

18. The method of claim 17, further comprising transmitting idle characters over respective channel-bonding interfaces of the plurality of channel-bonding interfaces in an absence of transmit packets.

19. The method of claim 17, wherein:
a data rate of the plurality of channel-bonding interfaces is distinct from a data rate of the media-independent interface; and
the directing further comprises adapting the transmit packets to the data rate of the plurality of channel-bonding interfaces.

20. The method of claim 17, wherein selecting the channel-bonding interface based on the logical link identifier comprises performing a look-up to map the logical link identifier to one of the plurality of PMEs.

21. The method of claim 14, wherein the multiplexing further comprises selectively coupling respective jitter buffers of the plurality of jitter buffers to the media-independent interface.

22. The method of claim 14, wherein each PME of the plurality of PMEs generates transmit signals on a distinct chunk of a frequency spectrum.

23. The method of claim 14, wherein the transmit signals comprise orthogonal frequency-division multiplexing (OFDM) signals.

24. The method of claim 14, wherein a respective PME of the plurality of PMEs comprises a physical coding sublayer, forward-error correction sublayer, physical medium attachment sublayer, and physical medium dependent sublayer.

25. A network device including a physical-layer (PHY) device, the PHY device comprising:
means for generating transmit signals on respective channels of a plurality of channels, based on transmit packets and for recovering packets from received signals;
means for directing the transmit packets from a media-independent interface to respective ones of the plurality of means for generating transmit signals and for multiplexing the recovered packets onto the media-independent interface, the means for directing the transmit packets and for multiplexing the recovered packets having a fixed delay;

means for coupling the means for directing the transmit packets to the plurality of means for generating the transmit signals; and means for buffering the recovered packets using a plurality of jitter buffers.

* * * * *